United States Patent
Tsai et al.

(10) Patent No.: US 8,477,119 B2
(45) Date of Patent: Jul. 2, 2013

(54) OPTICAL TOUCH SYSTEM, APPARATUS AND METHOD FOR CALCULATING THE POSITION OF AN OBJECT

(75) Inventors: Cheng-Nan Tsai, Hsinchu (TW); Tzung-Min Su, Hsinchu (TW); Chih-Hsin Lin, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 286 days.

(21) Appl. No.: 12/983,366

(22) Filed: Jan. 3, 2011

(65) Prior Publication Data

US 2011/0304588 A1 Dec. 15, 2011

(30) Foreign Application Priority Data

Jun. 11, 2010 (TW) .............................. 99119188 A

(51) Int. Cl.
*G06F 3/042* (2006.01)
(52) U.S. Cl.
USPC ..................... 345/175; 345/173; 178/18.09
(58) Field of Classification Search
USPC ............ 345/156, 173–178; 178/18.01, 18.03, 178/18.09, 18.11
See application file for complete search history.

(56) References Cited

U.S. PATENT DOCUMENTS

| | | | | |
|---|---|---|---|---|
| 4,782,328 A * | 11/1988 | Denlinger | ........................ | 341/5 |
| 5,638,093 A * | 6/1997 | Takahashi et al. | ............ | 345/173 |
| 7,689,381 B2 * | 3/2010 | Lin et al. | ........................ | 702/151 |
| 8,131,502 B2 * | 3/2012 | Su et al. | ........................ | 702/151 |
| 8,135,561 B2 * | 3/2012 | Lin et al. | ........................ | 702/150 |
| 8,232,511 B2 * | 7/2012 | Lin et al. | ..................... | 250/203.1 |
| 8,269,158 B2 * | 9/2012 | Chen et al. | .................. | 250/203.1 |
| 8,269,749 B2 * | 9/2012 | Lin et al. | ........................ | 345/175 |
| 8,305,363 B2 * | 11/2012 | Hsu et al. | ...................... | 345/175 |
| 2010/0010773 A1 * | 1/2010 | Lin et al. | ........................ | 702/152 |
| 2010/0094584 A1 * | 4/2010 | Su et al. | ........................ | 702/150 |
| 2011/0039659 A1 * | 2/2011 | Kim et al. | ......................... | 482/8 |
| 2011/0074822 A1 * | 3/2011 | Chang | ............................ | 345/649 |

* cited by examiner

*Primary Examiner* — Dmitriy Bolotin
(74) *Attorney, Agent, or Firm* — WPAT, PC; Justin King

(57) ABSTRACT

An optical touch system, an apparatus and a method for calculating the position of an object are provided. The apparatus includes an image sensor and a processing circuit. The processing circuit selects at least one dot from a curve segment of a brightness distribution profile obtained from a background image, wherein the curve segment corresponds to an imaging range of an object. And the processing circuit regards the column pixel brightness value corresponding to the dot as a brightness reference value. Afterwards, the processing circuit calculates brightness difference between the brightness reference value and the column pixel brightness values corresponding to the dots of a curve segment of a brightness distribution profile obtained from a sensed image, so as to further calculate a gravity of the imaging range. After that, the processing circuit regards the gravity as a representative position of the object in the sensed image.

12 Claims, 8 Drawing Sheets

OPTICAL TOUCH SYSTEM, APPARATUS AND METHOD FOR CALCULATING THE POSITION OF AN OBJECT

This application claims the priority benefit of Taiwan application serial no. 099119188, filed on Jun. 11, 2010, the entire contents of which are hereby incorporated by reference.

BACKGROUND

1. Technical Field

The present invention generally relates to touch technologies and, more particularly, to an optical touch system, an apparatus and a method for more accurately calculating the position of an object.

2. Description of the Related Art

FIG. 1 is a perspective view of an optical touch system in prior art. Referring to FIG. 1, the optical touch system 100 includes a panel 104, apparatuses 106 and 108 for calculating the position of an object, a coordinates-calculating apparatus 110 and reflectors 112 through 116. The apparatus 106 includes an image sensor 106A and a processing circuit 106B. The apparatus 108 includes an image sensor 108A and a processing circuit 108B. The processing circuits 106B and 108B are electrically coupled to the image sensors 106A and 108A respectively, so as to receive the sensed images from the image sensors 106A and 108A respectively. And each of the processing circuits 106B and 108B further calculates a gravity of an imaging range of the object 102 in the received sensed image so as to regard the gravity as a representative position of the object 102 in the received sensed image. The coordinates-calculating apparatus 110 is electrically coupled to the processing circuits 106B and 108B, so as to receive the two representative positions from the processing circuits 106B and 108B respectively. After that, the coordinates-calculating apparatus 110 calculates the relative coordinates of the object 102 on a touch surface 118 according to the two representative positions.

As shown in FIG. 1, the touch surface 118 is a quadrilateral area, which is preferably shaped in rectangle. The reflectors 112 through 116 are all used for reflecting light to the touch surface 118, and all of the reflectors do not form any mirror image of the touch surface 118.

FIG. 2 is a schematic view of the optical touch system 100 with single touch. In FIGS. 1 and 2, the objects of uniform labels represent the same element. As shown in FIG. 2, the image sensor 106A can sense the object 102 along the sensing path 202, and the image sensor 108A can sense the object 102 along the sensing path 204. Thus, as long as the crossing point of the sensing paths 202 and 204 can be obtained, the position of the pointer 102 can be acquired.

The processing circuit 106B calculates a gravity of an imaging range of the object 102 according to a sensed image sensed by the image sensor 106, so as to further regard the gravity as a representative position of the object 102 in the sensed image and output the representative position to the coordinates-calculating apparatus 110. Thus, the coordinates-calculating apparatus 110 can further acquire a straight line equation of the sensing path 202 in accordance with the respective position. Similarly, the processing circuit 108B calculates a gravity of an imaging range of the object 102 according to a sensed image sensed by the image sensor 108, so as to further regard the gravity as a representative position of the object 102 in the sensed image and output the representative position to the coordinates-calculating apparatus 110. Thus, the coordinates-calculating apparatus 110 can further acquire a straight line equation of the sensing path 204 in accordance with the respective position. However, the gravities calculated by the processing circuits 106B and 108B often have deviation, so that the coordinates of the object 102 calculated by the coordinates-calculating apparatus 110 may have some error. Further explanation is given as follows.

Take an operation of the apparatus 106 as an example. Before the object 102 touches the touch surface 118, the processing circuit 106B controls the image sensor 106A to sense the touch surface 118, so as to obtain an image. The image does not contain any image of the object 102. And the processing circuit further regards the image as a background image. Then, the processing circuit 106B acquires a brightness value of at least one pixel in each pixel column of the background image, so as to obtain a brightness distribution profile. For example, the processing circuit 106B can acquire the brightness values of the N brightest pixels in each pixel column of the background and calculate an average brightness value or a total brightness value of the N brightest pixels in each pixel column to obtain a brightness distribution profile, wherein N is a natural number. Certainly, the processing circuit 106B also can acquire the brightness values of a plurality of pixels whose brightness values are larger than a predetermined value in each pixel column of the background image, so as to calculate an average brightness value of the plurality of pixels whose brightness values are larger than the predetermined value to obtain a brightness distribution profile. Since the brightness of the background is usually non-homogeneous, the brightness distribution profile is presented as a curve. FIG. 3 is an exemplary brightness distribution profile obtained from the background image, each dot of the curve shown in FIG. 3 represents a column pixel brightness value of the background image.

When the object 102 touches the touch surface 118, the processing circuit 106B obtains an image containing an image of the object 102 through the image sensor 106A. FIG. 4 is a schematic view of an image sensed by the image sensor. In FIG. 4, label 400 represents an image sensing window of the image sensor 106A. A white zone labeled by 402 is a bright zone with a higher brightness in the image, and the bright zone is formed by the light reflected by the reflectors 114 and 116. The bright zone 402 is the main sensing area. Label 404 represents a dark stripe formed by the object 102.

When the image containing an image of the object 102 is obtained, the processing circuit 106B regards the obtained image as a sensed image and further obtains a brightness distribution profile of the sensed image by the same way of obtaining the above brightness distribution profile. FIG. 5 is an exemplary brightness distribution profile obtained from the sensed image, each dot of the curve shown in FIG. 5 represents a column pixel brightness value of the sensed image. In FIG. 5, a range labeled by W is a range with low brightness formed by the object 102. Then, the processing circuit 106B compares the two brightness distribution profiles shown in FIGS. 3 and 5 to obtain the brightness difference between the two brightness distribution profiles, so as to determine a plurality of column pixel brightness values in the brightness distribution profile of the sensed image as an imaging range of the object 102. For example, after obtaining the brightness difference between the two brightness distribution profiles, the processing circuit 106B determines a distribution range of a plurality of column pixel brightness values in the brightness distribution profile of the sensed image as an imaging range of the object 102. There is a brightness difference lager than a predetermined brightness difference between each column pixel brightness value in the distribution range and each column pixel brightness value in a corresponding range in the brightness distribution profile of the background image. In other words, a distribution range of column pixels with the predetermined brightness difference is regarded as an imaging range of the object 102 in the image sensing window 400 of the image sensor 106 A. In this embodiment, a range labeled by W in FIG. 5 is an imaging range corresponding to the above description.

After the imaging range of the object 102 is obtained, the processing circuit 106B calculates the brightness difference between the curve segments related to the obtained imaging range of the two brightness distribution profiles, so as to further calculate a gravity of the imaging range of the object 102. FIG. 6 shows the curve segments related to the obtained imaging range of the two brightness distribution profiles. In FIG. 6, a range labeled by W is a range with low brightness formed by the object 102. The curve segment formed by the dots $B_0$-$B_N$ is a curve segment related to the imaging range of the brightness distribution profile of the background image. The curve segment formed by the dots $S_O$-$S_N$ is a curve segment related to the imaging range of the brightness distribution profile of the sensed image, wherein N is a natural number. Supposing that the positions of the dots $B_0$-$B_N$ in the x-axis of the image sensing window 400 are $X_0$-$X_N$ in turn, and the positions of the dots $S_O$-$S_N$ in the x-axis of the image sensing window 400 are also $X_0$-$X_N$ in turn, the processing circuit 106B can calculate the gravity of the imaging range of the object 102 in accordance with an equation (1) as follows.

$$G = \frac{\sum_{i=0}^{N} \Delta I_i \cdot X_i}{\sum_{i=0}^{N} \Delta I_i} \quad (1)$$

Wherein, G represents the gravity, $\Delta I_i = B_i - S_i$, $\Delta I_i$ represents the brightness difference.

Generally speaking, the more close the calculated gravity approaches to the center of the range W, the more accurate the object position will be obtained. The center of the range W can be represented by following equation (2).

$$C = \frac{X_0 + X_N}{2} \quad (2)$$

Wherein, C represents the center. However, since the background brightness is inconsistent, the gradient of the curve segment formed by $B_0$~$B_N$ changes, so that the gravity calculated by the processing circuit 106B may deviate along with the gradient of the curve segment. This will further make the calculated gravity farther away from the center. Since the gravity calculated by the processing circuit 106B may has deviation, the coordinates of the object 102 calculated by the coordinates-calculating apparatus 110 may have some error.

BRIEF SUMMARY

The present invention relates to an apparatus for calculating the position of an object, the gravity in an imaging range of the object obtained by the apparatus is relatively accurate.

The present invention also relates to a method for calculating the position of an object.

The present invention also relates to an optical touch system using the above apparatus and method for calculating the position of an object, and the gravity in an imaging range of the object obtained by the optical touch system is relatively accurate.

The present invention provides an apparatus for calculating the position of an object. The apparatus is suitable for an optical touch system and is provided for determining a representative position of the object in a sensed image. The apparatus includes an image sensor and a processing circuit. The processing circuit is electrically coupled to the image sensor. The processing circuit acquires a sensed image containing an image of the object through the image sensor, and the processing circuit obtains brightness value of at least one pixel in each pixel column of the sensed image to obtain a first brightness distribution profile. And the processing circuit compares the first brightness distribution profile with a second brightness distribution profile obtained from a background image, so as to select a plurality of column pixel brightness values in the first brightness distribution profile as an imaging range of the object. The processing circuit selects column pixel brightness value corresponding to at least one dot from a curve segment of the imaging range in the second brightness distribution profile, so as to regard the selected column pixel brightness value as a brightness reference value. The processing circuit further calculates the brightness difference between the brightness reference value and the column pixel brightness value corresponding to each dot of the curve segment of the imaging range in the first brightness distribution profile, so as to calculate a gravity of the imaging range and to regard the gravity as a representative position of the object in the sensed image.

In an embodiment of the aforementioned apparatus, after comparing the first brightness distribution profile and the second brightness distribution profile, the processing circuit regards a distribution range of a plurality of column pixel brightness values in the first brightness distribution profile as the imaging range of the object. There is a brightness difference lager than a predetermined brightness difference between each column pixel brightness value in the distribution range and each column pixel brightness value in a corresponding range in the second brightness distribution profile.

In an embodiment of the aforementioned apparatus, the processing circuit acquires the brightness values of the N brightest pixels of each pixel column in the sensed image, so as to calculate an average brightness value or a total brightness value of the selected N brightest pixels in each pixel column to obtain the first brightness distribution profile, wherein N is a natural number. The background image is an image which is obtained in advance by the processing circuit, and it does not contain any image of the object. The processing circuit also calculates an average brightness value or a total brightness value of the selected N brightest pixels in each pixel column of the background image, so as to obtain the second brightness distribution profile.

In an embodiment of the aforementioned apparatus, the processing circuit acquires the brightness values of a plurality of pixels whose brightness values are larger than a predetermined value in each pixel column of the sensed image, so as to calculate an average brightness value of the pixels whose brightness values are larger than the predetermined value in each pixel column to obtain the first brightness distribution profile. The background image is an image which is obtained in advance by the processing circuit, and it does not contain any image of the object. The processing circuit also calculates an average brightness value of the pixels whose brightness values are larger than the predetermined value in each pixel column of the background image.

In an embodiment of the aforementioned apparatus, the processing circuit acquires the column pixel brightness value corresponding to the lowest dot of the curve segment corresponding to the imaging range in the second brightness distribution profile, and the processing circuit regards the acquired column pixel brightness value as the brightness reference value.

The present invention also provides a method for calculating the position of an object. The method is suitable for an optical touch system and is provided for determining a representative position of the object in a sensed image. The method comprises the following steps: acquiring a brightness value of at least a pixel in each pixel column of the sensed image containing an image of the object, so as to obtain a first brightness distribution profile; comparing the first brightness distribution profile with a second brightness distribution profile obtained from a background image, so as to select a plurality of column pixel brightness values in the first brightness distribution profile as an imaging range of the object; selecting a column pixel brightness value corresponding to at least one dot from a curve segment of the imaging range in the second brightness distribution profile, so as to regard the selected column pixel brightness value as a brightness reference value; and calculating the brightness difference between the brightness reference value and the column pixel brightness value corresponding to each dot of the curve segment of the imaging range in the first brightness distribution profile, so as to calculate a gravity of the imaging range and to regard the gravity as a representative position of the object in the sensed image.

In an embodiment of the aforementioned method, after comparing the first brightness distribution profile and the second brightness distribution profile, a distribution range of a plurality of column pixel brightness values in the first brightness distribution profile is regarded as the imaging range of the object, wherein there is a brightness difference lager than a predetermined brightness difference between each column pixel brightness value in the distribution range and each column pixel brightness value in a corresponding range in the second brightness distribution profile.

In an embodiment of the aforementioned method, the brightness values of the N brightest pixels of each pixel column in the sensed image are acquired, so as to calculate an average brightness value or a total brightness value of the selected N brightest pixels in each pixel column to obtain the first brightness distribution profile, wherein N is a natural number. The background image is an image which is obtained in advance, and it does not contain any image of the object. And an average brightness value or a total brightness value of the selected N brightest pixels in each pixel column of the background image is also calculated, so as to obtain the second brightness distribution profile.

In an embodiment of the aforementioned method, the brightness values of a plurality of pixels whose brightness values are larger than a predetermined value in each pixel column of the sensed image are acquired, so as to calculate an average brightness value of the plurality of pixels of each pixel column to obtain the first brightness distribution profile, The background image is an image which is obtained in advance, and it does not contain any image of the object. And an average brightness value of the pixels whose brightness values are larger than the predetermined value in each pixel column of the background image is calculated, so as to obtain the second brightness distribution profile.

In an embodiment of the aforementioned method, a column pixel brightness value corresponding to the lowest dot of the curve segment corresponding to the imaging range in the second brightness distribution profile is regarded as the brightness reference value.

The present invention also provides an optical touch system. The optical touch system includes a touch surface, at least two apparatuses for calculating the representative position of an object sense by the two apparatuses and a coordinates-calculating apparatus. The touch surface is used for providing an interactive interface between the object and the optical touch system. The said at least two apparatuses are configured in different places of the touch surface, and the relative position between the said at least two apparatuses and the touch surface is known. The coordinates-calculating apparatus is used for calculating a relative coordinates of the object on the touch surface in accordance with the relative position between the said at least two apparatuses and the touch surface and the representative positions of the object sensed by the said at least two apparatuses.

The present invention also provides an optical touch system. The optical touch system includes a touch surface, a mirror element, an apparatuses for calculating the representative position of an object sensed by the apparatus and a coordinates-calculating apparatus. The touch surface is used for providing an interactive interface between the object and the optical touch system. The mirror element is used for forming a mirror image of the touch surface. The apparatus is used for calculating the representative position of the object sensed by the apparatus and for calculating a representative position of a virtual object formed in the mirror image. The relative position between the apparatus and the touch surface is known, and the apparatus and the mirror element are configured on two opposite sides of the touch surface. The coordinates-calculating apparatus is used for calculating a relative coordinates of the object on the touch surface in accordance with the relative position between the apparatus and the touch surface and the representative positions of the object and the virtual object sensed by the apparatus.

The present invention is implemented by the steps of obtaining the imaging range of the object in the image sensing window of the image sensor, selecting the column pixel brightness value corresponding to at least a dot from a curve segment of the imaging range in the brightness distribution profile obtained from the background image and regarding the selected column pixel brightness value as a brightness reference value, and calculating the brightness difference between the brightness reference value and the column pixel brightness value corresponding to each dot of the curve segment of the imaging range in the brightness distribution profile obtained from a sensed image to obtain the gravity of the imaging range and to regard the obtained gravity as a representative position of the object in the sensed image. Since the brightness reference value is a constant value, the gravity without deviation caused by the influence of the background brightness can be obtained. As stated above, since there is only a slight deviation between the obtained gravity and the center of the low brightness range in the sensed image formed by the object, the error of the coordinates of the object may be slight and admissible.

For above and another objectives, features, and advantages of the present invention being better understood and legibly, accompanying embodiments together with the drawings are particularized.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

With reference of the drawings, an optical touch system, apparatus and method for calculating the position of an object in accordance with an exemplary embodiment of present invention is described as follows.

A First Embodiment

Figure 1:
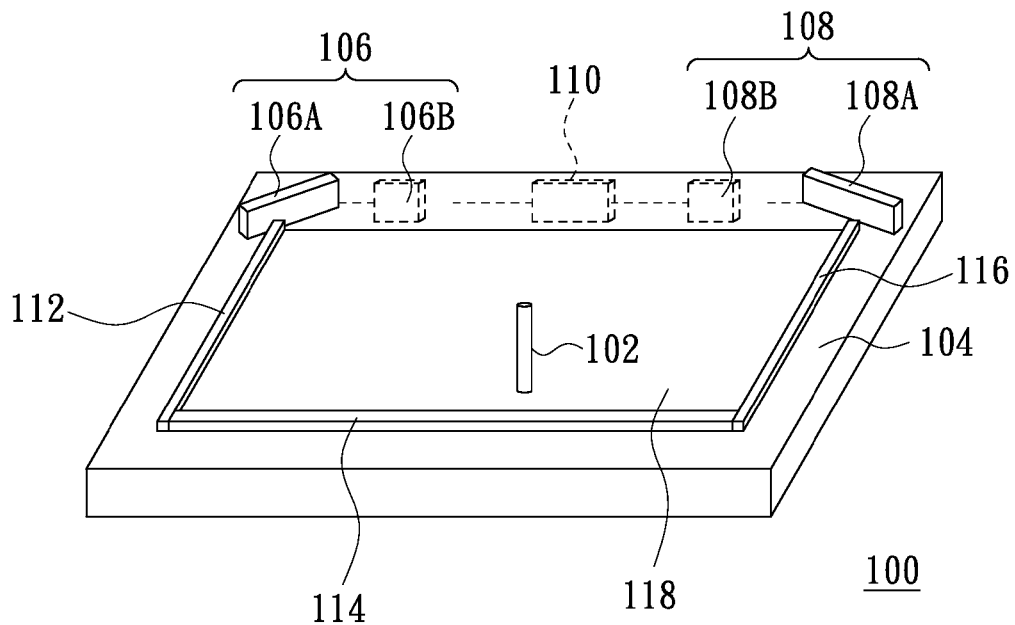
FIG. 1 is a perspective view of an optical touch system in prior art.
Figure 2:
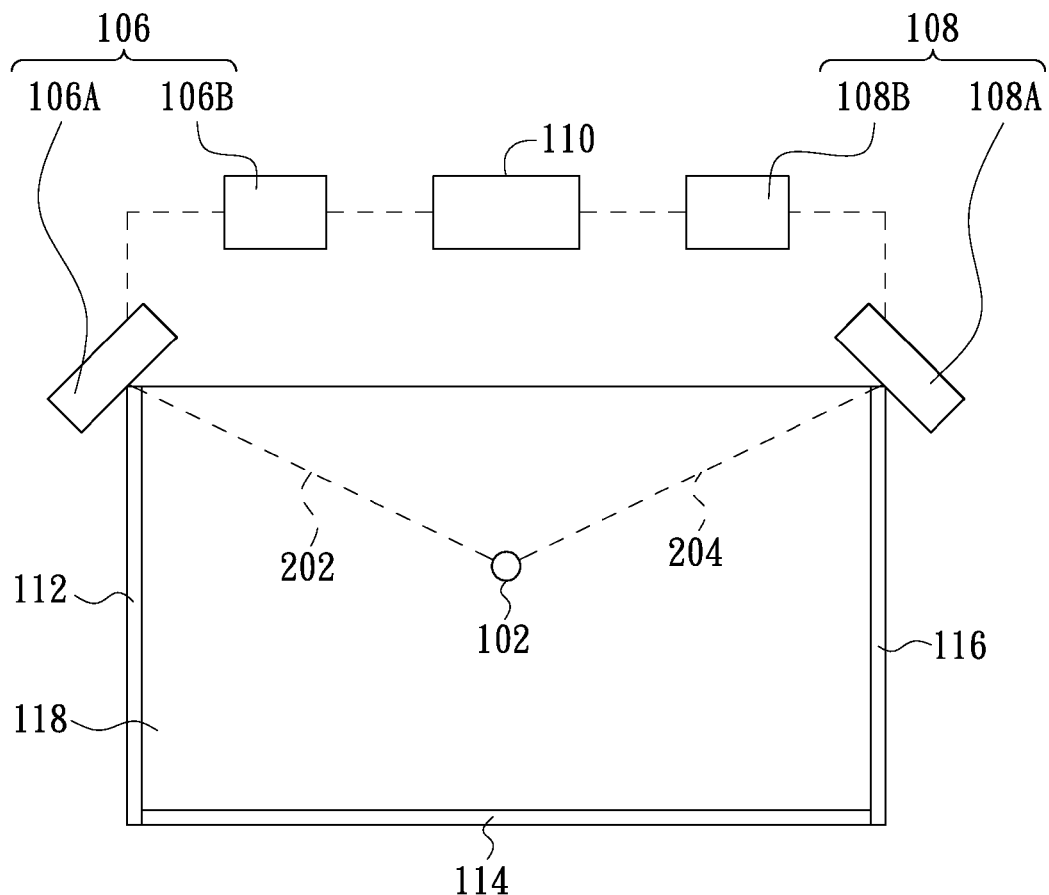
FIG. 2 is a schematic view of the optical touch system with single touch.
Figure 3:
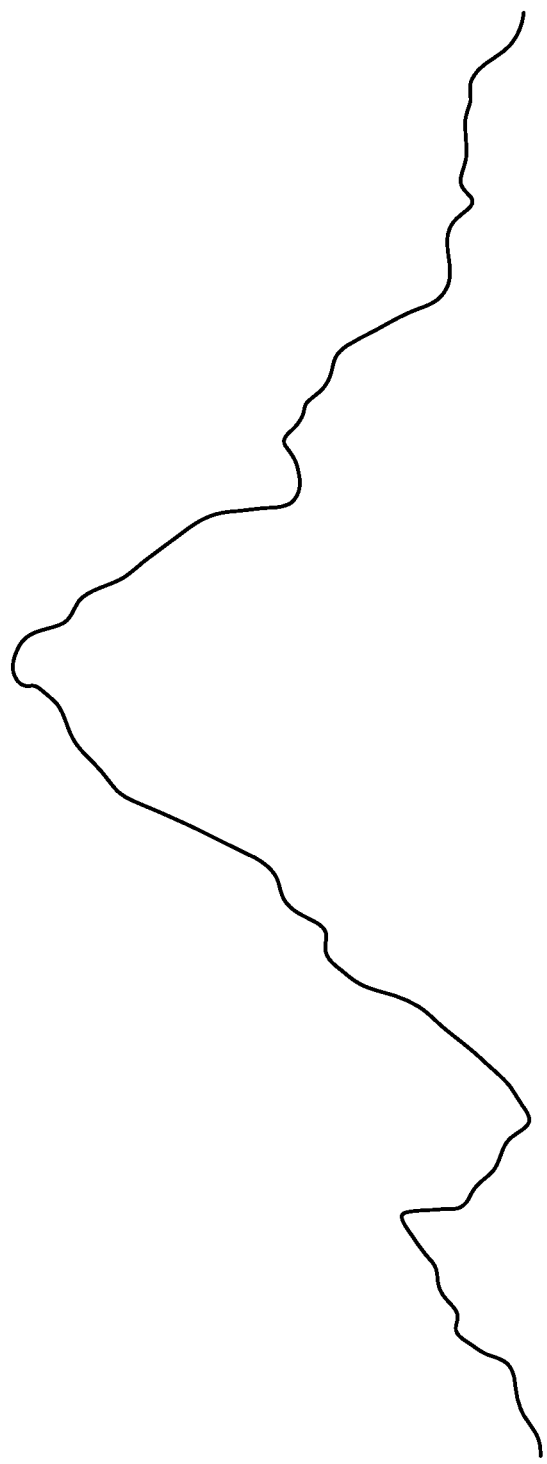
FIG. 3 shows an exemplary brightness distribution profile obtained from the background image.
Figure 4:
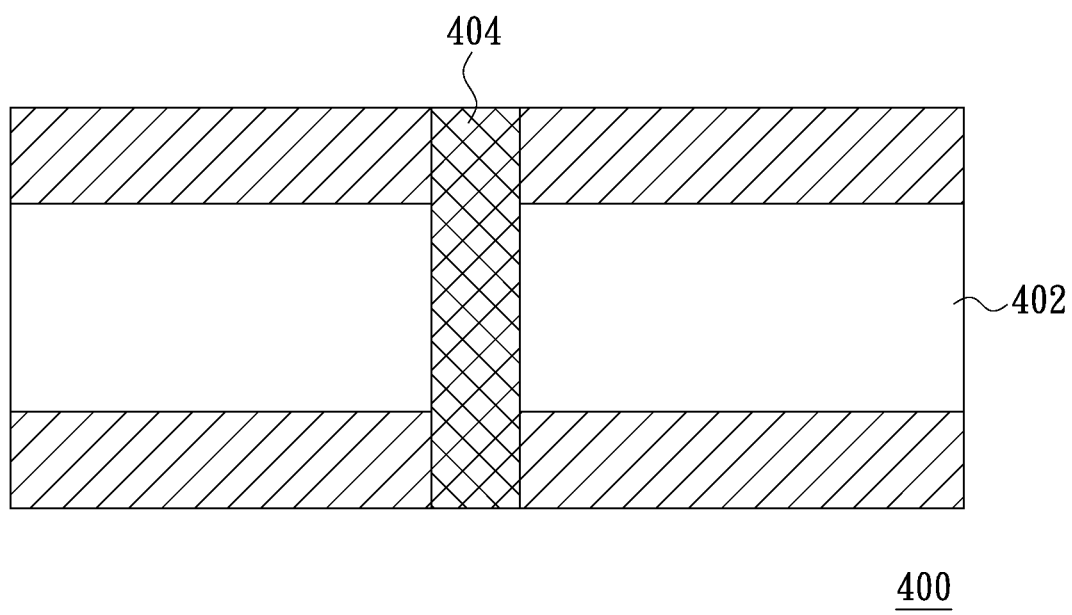
FIG. 4 is a schematic view of an image sensed by the image sensor.
Figure 5:
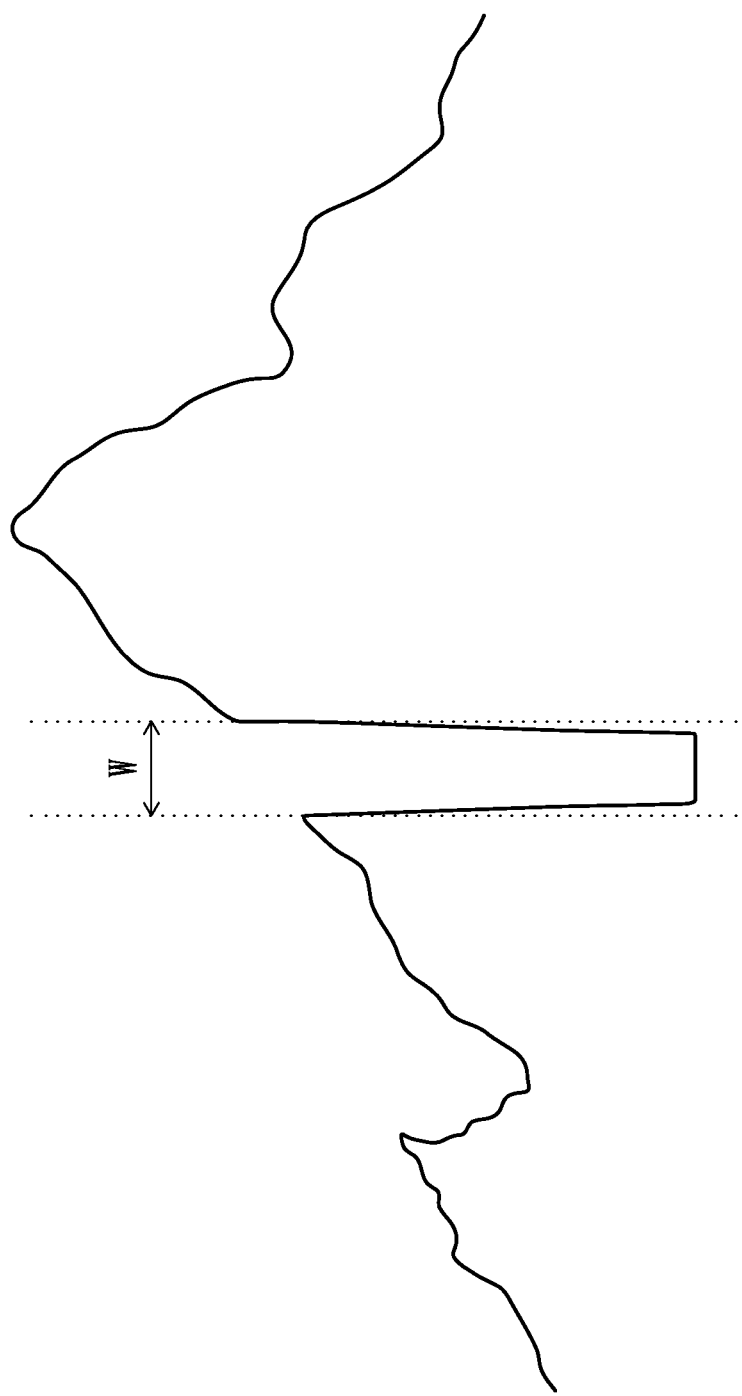
FIG. 5 shows an exemplary brightness distribution profile obtained from the sensed image.
Figure 6:
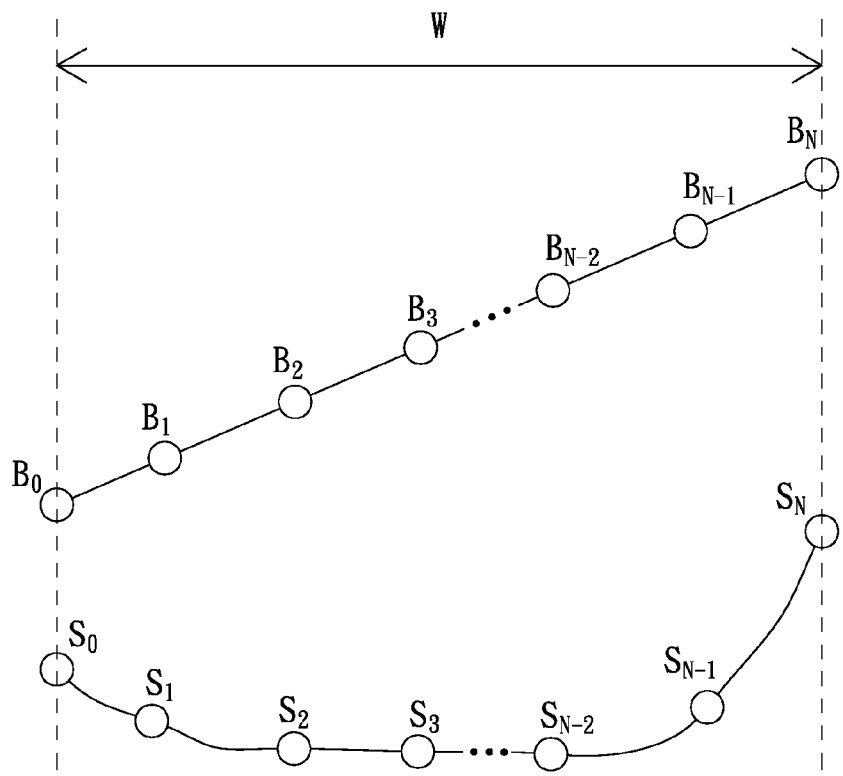
FIG. 6 shows the curve segments related to the obtained imaging range of the two brightness distribution profiles.

The structure of the optical touch system in this embodiment is the same with the structure of the optical touch system shown in FIG. 1, but the difference between the two optical touch systems is that the apparatus, used for calculating the position of an object, of the optical touch system in this embodiment operates in another manner. Therefore, the structure shown in FIG. 1 is referred to describe the operation of the optical touch system in this embodiment.

As shown in FIG. 1, the touch surface 118 has four boundaries (not labeled) connected in turn. The image sensors 106A and 108A are respectively configured in two different corners of the touch surface 118 and on a same side of the touch surface 118. Thus, the image sensors 106A and 108A can sense images of the touch surface 118 from two different orientations.

Next, an operation process of the optical touch system in this embodiment is described as follows. Take an operation of the apparatus 106 as an example. Before the object 102 touches the touch surface 118, the processing circuit 106B controls the image sensor 106A to sense the touch surface 118, so as to obtain an image which does not contain any image of the object 102. And the processing circuit 106B further regards the obtained image as a background image. Then, the processing circuit 106B acquires a brightness value of at least a pixel in each pixel column of the background image to obtain a first brightness distribution profile. For example, the processing circuit 106B acquires the brightness values of the N brightest pixels and calculates an average brightness value or a total brightness value of the N brightest pixels in each pixel column to obtain a brightness distribution profile, wherein N is a natural number. Certainly, the processing circuit 106B also can acquire the brightness values of a plurality of pixels whose brightness values is larger than a predetermined value in each pixel column of the background image, so as to calculate an average brightness value of the plurality of pixels whose brightness values are larger than the predetermined value in each pixel column to obtain a brightness distribution profile.

Afterwards, when the object 102 touches the touch surface 118, the processing circuit 106B obtains an image containing an image of the object 102 through the image sensor 106A. When the image containing an image of the object 102 is obtained, the processing circuit 106B regards the obtained image as a sensed image and further obtains a brightness distribution profile of the sensed image by the same way of obtaining the above brightness distribution profile. Then, the processing circuit 106B compares the two brightness distribution profiles, so as to determine a plurality of column pixel brightness values in the brightness distribution profile of the sensed image as an imaging range of the object 102. For example, when the brightness difference between the two brightness distribution profiles is obtained, the processing circuit 106B can further regards a distribution range of a plurality of column pixel brightness values in the brightness distribution profile of the sensed image as an imaging range of the object 102. There is a brightness difference lager than a predetermined brightness difference between each column pixel brightness value in the distribution range and each column pixel brightness value in a corresponding range in the brightness distribution profile of the background image. In other words, a distribution range of column pixels with the predetermined brightness difference is regarded as an imaging range of the object 102 in the image sensing window of the image sensor 106A.

Figure 7:
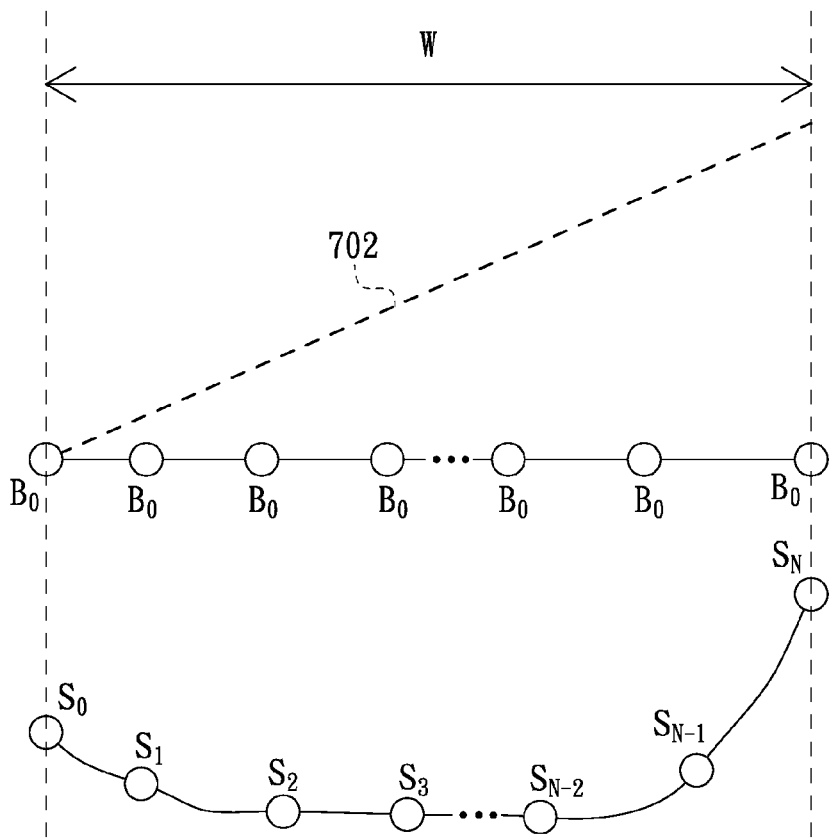
FIG. 7 shows the curve segments related to the obtained imaging range of the two brightness distribution profiles.

When the imaging range of the object 102 is obtained, the processing circuit 106B calculates a gravity of the imaging range of the object 102 in accordance with the curve segments related to the obtained imaging range of the two brightness distribution profiles. FIG. 7 shows the curve segments related to the obtained imaging range of the two brightness distribution profiles. Referring to FIG. 7, a range labeled by W is a range with low brightness formed by the object 102, a broken line labeled by 702 represents a curve segment related to the imaging range of the brightness distribution profile of the background image. The curve segment formed by the dots $S_0$-$S_N$ is a curve segment related to the imaging range of the brightness distribution profile of the sensed image. In this embodiment, the positions of the dots $B_0$-$B_N$ in the x-axis of the image sensing window are supposed to be $X_0$-$X_N$ in turn.

Referring to FIG. 7, in this embodiment, the processing circuit 106B selects at least a dot from the curve segment 702 and regards the column pixel brightness value corresponding to the said at least a dot as a brightness reference value. For example, the processing circuit 106B selects the lowest dot $B_0$ from the curve segment 702 and regards the column pixel brightness value corresponding to the dot $B_0$ as a brightness reference value. For explanation, in FIG. 7, the brightness reference value is represented by a line formed by a plurality of dots $B_0$, and the positions of the dots $B_0$ in the x-axis of the image sensing window are $X_0$-$X_N$ in turn from left to right. After the brightness reference value is obtained, the processing circuit 106B calculates the brightness difference between the brightness reference value and the column pixel brightness value corresponding to each dot of the curve segment related to the imaging range of the brightness distribution profile obtained from the sensed image, so as to further calculate a gravity of the imaging range. After that, the processing circuit 106B regards the gravity as a representative position of the object 102 in the sensed image. Since the brightness reference value is a constant value, the gravity without deviation caused by the influence of the background brightness can be obtained.

Similarly, the operation of the apparatus 108 can be the same with the operation of the apparatus 106, so that another gravity which does not have any deviation caused by the influence of the background brightness can be obtained. Afterwards, the coordinates-calculating apparatus 110 calculates the relative coordinates of the object 102 on the touch surface 118 in accordance with the two gravities obtained by the processing circuits. As stated above, since there is only a slight deviation between the obtained gravities and the center of the low brightness range in the sensed image formed by the object 102, the error of the coordinates of the object 102 may be slight and admissible.

Although in this embodiment the two apparatuses 106 and 108 calculate the gravity of the image range of the object 102 by the same manner, one skilled in the art can understand that the coordinates of the object 102 obtained by the optical touch system of the present invention can still be more accurate than that of the prior art when only one of the apparatuses 106 and 108 is operated in the above manner. Certainly, when the two processing circuit 106B and 108B respectively obtains a brightness distribution profile by calculating the brightness value of each pixel column of the background image, the two processing circuits can further respectively record the brightness distribution profile. Thus, the operation of obtaining the brightness distribution profile will not need to be processed repeatedly.

In this embodiment, it is better that each of the reflectors made by a retro-reflective material. In addition, each of the reflectors in this embodiment can be replaced with a lighting element as long as each of the lighting elements radiates light towards to the touch surface 118.

Figure 8:
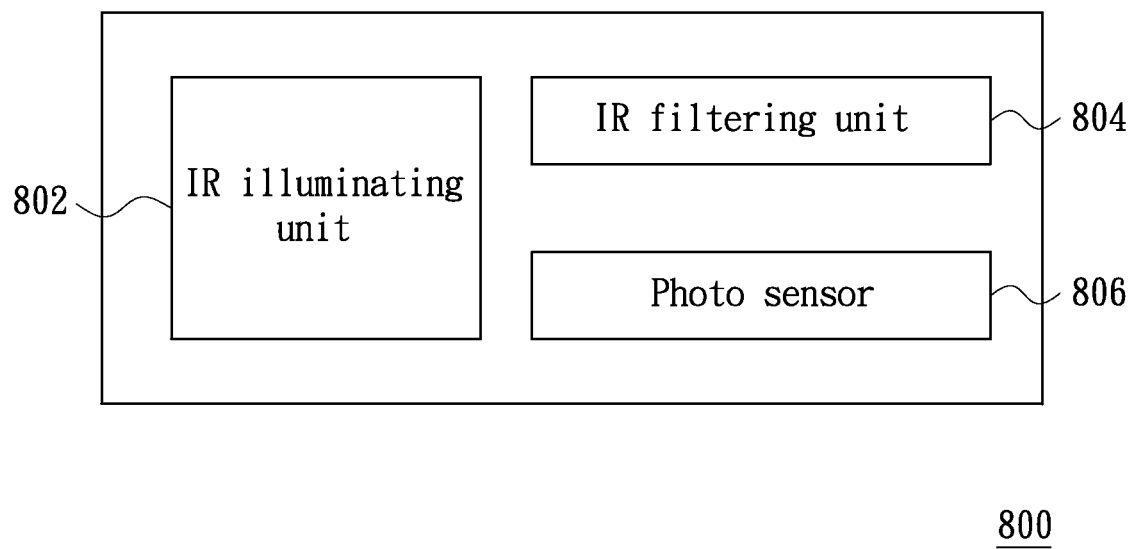
FIG. 8 shows an image sensor used for the optical touch system in accordance with an embodiment of the present invention.

FIG. 8 shows an image sensor used for the optical touch system in the present invention. Referring to FIG. 8, the image sensor 800 includes an infra-red (IR) illuminating unit 802, an IR filtering unit 804 which only allows IR ray to pass through and a photo sensor 806. The photo sensor 806 is used for obtaining an image of the touch surface 118 through the IR filtering unit 804. The photo sensor 806 is electronically coupled to a processing circuit. The IR illuminating unit 802 can be implemented by an IR light-emitting diode (IR LED), and the IR filtering unit 804 can be implemented by an IR-pass filter.

From the above description, one skilled in the art can learn that, in this embodiment, the optical touch system should include a touch surface, at least two apparatuses for calculating the position of an object and a coordinates-calculating apparatus. The touch surface is used for providing an interactive interface between the object and the optical touch system. The said at least two apparatuses are used for calculating the representative positions of the object sensed by the said at least two apparatuses. The said at least two apparatuses for calculating the position of the object are configured in different places of the touch surface, and the relative position between the said at least two apparatuses and the touch surface is known. The coordinates-calculating apparatus is used for calculating a relative coordinates of the object on the touch surface in accordance with the relative position between the said at least two apparatuses and the touch surface and the representative positions of the object sensed by the said at least two apparatuses.

A Second Embodiment

From the first embodiment, one skilled in the art should know that the present invention can also be implemented if the optical touch system is changed to adopt only one apparatus for calculating the position of the object. Further explanation is given as follows.

Figure 9:
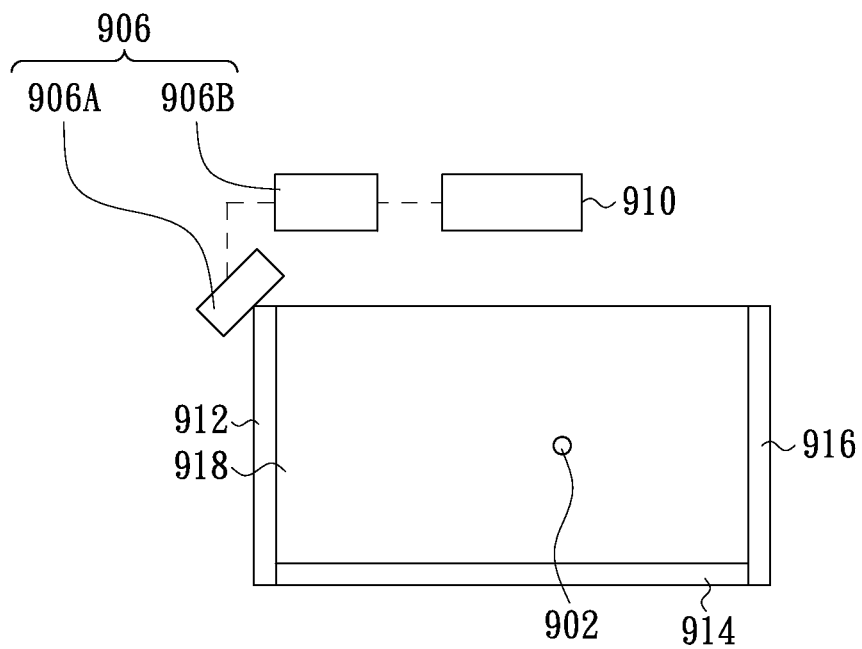
FIG. 9 is a top plan view of the optical touch system in accordance with another embodiment of the present invention.

FIG. 9 shows a top plan view of the optical touch system in accordance with another embodiment. In FIG. 9, the label 906 represents an apparatus for calculating the position of the object, the label 906A represents an image sensor, the label 906B represents a processing circuit, the label 910 represents a coordinates-calculating apparatus, the labels 912 and 916 represent two reflectors, the label 914 represents a mirror element (such as a plane reflecting mirror), a quadrilateral area labeled by 918 represents a touch surface of the optical touch system, and the label 902 represents an object.

The touch surface 918 is a quadrilateral area, which is preferably shaped in rectangle. The reflector 912 can be adopted or not in accordance with actual requirement. Both the reflectors 912 and 916 can be replaced with illumining elements. The mirror element 914 is used for forming a mirror image of the touch surface 918. In an embodiment, a mirror image of the mirror element 914 is vertical to the touch surface 918. The image sensor 906A is used for sensing an image of the touch surface 918 and a mirror image formed by the mirror element 914. The hardware structure shown in FIG. 8 is suitable for the image sensor 906. The processing circuit 906B is electrically connected to the image sensor 906A for receiving an image sensed by the image sensor 906A. The coordinates-calculating apparatus 910 is electrically coupled to the processing circuits 906B and 108B, so as to receive the two representative positions from the processing circuit 906B. After that, the coordinates-calculating apparatus 910 calculates the relative coordinates of the object 902 on a touch surface 918 according to the two representative positions.

Figure 10:
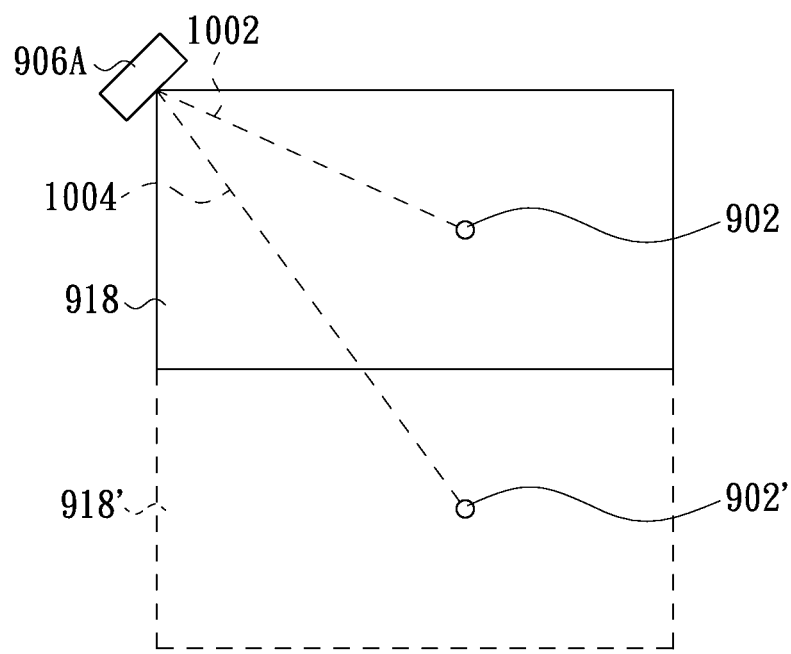
FIG. 10 is a schematic view of the optical touch system in operation shown in FIG. 9.

FIG. 10 is a schematic view of the optical touch system in operation shown in FIG. 9. In FIGS. 9 and 10, the objects of uniform labels represent the same element. And the label 918' represents a mirror image of the touch surface 918, the label 902' represents a virtual object formed in the mirror image 918' and formed by the object 902. In FIG. 10, the image sensor 906A can sense the object 902 along the sensing path 1002, and the image sensor 906A also can sense the virtual object 902' along the sensing path 1004. Thus, as long as the processing circuit 906B can calculate the imaging gravities of the object 902 and the virtual object 902' (i.e., the representative positions of the of the object 902 and the virtual object 902'), the coordinates-calculating apparatus 910 can further calculate the coordinates of the object 902 in accordance with the imaging gravities of the object 902 and the virtual object 902'. As to the detailed calculate regulation of calculating the coordinates of an object by the optical touch system with single image sensor, please refer to a calculating method described in a patent of TW097126033 or other literatures. Here we will not go further on this issue.

Next, an operation process of the optical touch system in this embodiment is described as follows. Before the object 902 touches the touch surface 918, the processing circuit 906B senses the touch surface 918 and the mirror image 918' of the touch surface 918 through the image sensor 906A, so as to obtain an image without any image of the object 902 and the virtual object 902' and to further regard the image as a background image. Then, the processing circuit 906B acquires a brightness value of at least a pixel in each pixel column of the background image to obtain a first brightness distribution profile. For example, the processing circuit 906B acquires the brightness values of the N brightest pixels in each pixel column of the background image, and the processing circuit 906B calculates an average brightness value or a total brightness value of the N brightest pixels in each pixel column to obtain a brightness distribution profile, wherein N is a natural number. Certainly, the processing circuit 906B also can acquire the brightness values of a plurality of pixels whose brightness values are larger than a predetermined value in each pixel column of the background image, so as to calculate an average brightness value of the plurality of pixels whose brightness values are larger than the predetermined value in each pixel column to obtain a brightness distribution profile.

When the object 902 touches the touch surface 918, the processing circuit 906B senses the touch surface 918 and the mirror image 918' of the touch surface 918 through the image sensor 906A, so as to obtain an image containing an image of the object 902 and the virtual object 902'. When the image containing an image of the object 902 and the virtual object 902' is obtained, the processing circuit 906B regards the obtained image as a sensed image and further obtains a brightness distribution profile of the sensed image by the same way of obtaining the above brightness distribution profile from the background image. Then, the processing circuit 906B compares the two brightness distribution profiles, so as to regard two distribution ranges of a plurality of column pixel brightness values in the brightness distribution profile of the sensed image as two imaging ranges corresponding to of the object 902 and the virtual object 902'. The two imaging ranges are formed by the two dark stripes formed by the object 902 and the virtual object 902' in the image sensing window of the image sensor 906. In this embodiment, the processing circuit 906B regards the two distribution ranges of a plurality of column pixel brightness values in the brightness distribution profile of the sensed image as two imaging ranges corresponding to the object 902 and virtual object 902'. There is a brightness difference lager than a predetermined brightness difference between each column pixel brightness value in the distribution range in the brightness distribution profile of the sensed image and each column pixel brightness value in a corresponding range in the brightness distribution profile of the background image. In other words, two distribution ranges of the column pixels with the predetermined brightness difference are regarded as two imaging ranges of the object 902 and the virtual object 902' in the image sensing window of the image sensor 906.

After the two imaging ranges corresponding to the object 902 and the virtual object 902' are obtained, the processing circuit 906B calculates the gravities of the imaging ranges of the object 902 and the virtual object 902' in accordance with the two curve segments corresponding to the imaging range of the two brightness distribution profiles. In actual calculation, the processing circuit 906B acquires the column pixel brightness value corresponding to at least a dot in two curve segments corresponding to the imaging range in the brightness distribution profile of the background image as a brightness reference value. Afterwards, the processing circuit 906B calculates the brightness difference between the brightness reference value and the column pixel brightness value corresponding to each dot of the two curve segments corresponding to the two imaging ranges of the brightness distribution profile obtained from the sensed image, so as to further calculate the two gravities corresponding to the two imaging ranges. After that, the processing circuit 906B regards the two gravities as the representative positions of the object 902 and the virtual object 902' in the sensed image. Since the brightness reference value is a constant value, the gravities without deviation caused by the influence of the background brightness can be obtained.

From the above description, one skilled in the art can learn that, in this embodiment, the optical touch system should include a touch surface, a mirror element, an apparatus for calculating the position of an object and a coordinates-calculating apparatus. The touch surface is used for providing an interactive interface between the object and the optical touch system. The mirror element is used for forming a mirror image of the touch surface. The apparatus is used for calculating a representative position of the object sensed by the apparatus and for calculating a representative position of a virtual object formed in the mirror image and formed by the object. The relative position between the apparatus and the touch surface is known, and the apparatus and the mirror element are configured on two opposite sides of the touch surface. The coordinates-calculating apparatus is used for calculating a relative coordinates of the object on the touch surface in accordance with the relative position between the apparatus and the touch surface and the representative positions of the object and the virtual object related to the apparatus.

Figure 11:
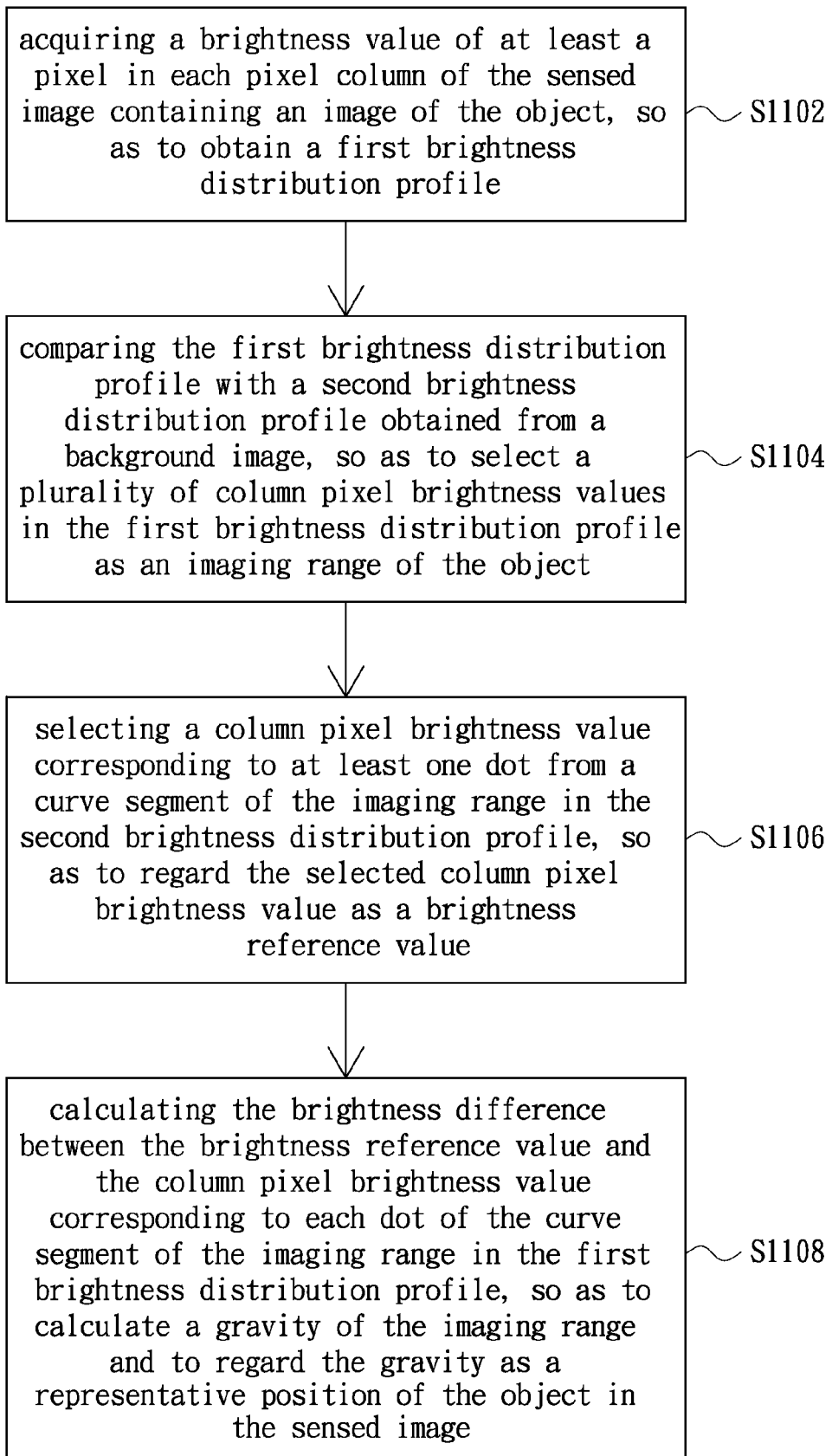
FIG. 11 is a flow chart of the method of calculating the position in accordance with an embodiment of the present invention.

From the above embodiments, a method of calculating the position of an object is concluded as shown in FIG. 11. FIG. 11 is a flow chart of the method of calculating the position in accordance with an embodiment of the present invention. The method is suitable for an optical touch system and is used for determining a representative position of the object in a sensed image. The method includes the following steps: acquiring a brightness value of at least one pixel in each pixel column of the sensed image containing an image of the object to obtain a first brightness distribution profile (shown in step S1102); comparing the first brightness distribution profile with a second brightness distribution profile obtained from a background image, so as to select a plurality of column pixel brightness values in the first brightness distribution profile as an imaging range of the object (shown in step S1104); selecting a column pixel brightness value corresponding to at least one dot from a curve segment of the imaging range in the second brightness distribution profile, so as to regard the selected column pixel brightness value as a brightness reference value (shown in step S1106); and calculating the brightness difference between the brightness reference value and the column pixel brightness value corresponding to each dot of the curve segment of the imaging range in the first brightness distribution profile, so as to calculate a gravity of the imaging range and to regard the gravity as a representative position of the object in the sensed image (shown in step S1108).

As stated above, the present invention is implemented by the steps of obtaining the imaging range of the object in the image sensing window of the image sensor, selecting the column pixel brightness value corresponding to at least a dot from a curve segment of the imaging range in the brightness distribution profile obtained from the background image and regarding the selected column pixel brightness value as a brightness reference value, and calculating the brightness difference between the brightness reference value and the column pixel brightness value corresponding to each dot of the curve segment of the imaging range in the brightness distribution profile obtained from a sensed image to obtain the gravity of the imaging range and to regard the obtained gravity as a representative position of the object in the sensed image. Since the brightness reference value is a constant value, the gravity without deviation caused by the influence of the background brightness can be obtained. As stated above, since there is only a slight deviation between the obtained gravity and the center of the low brightness range in the sensed image formed by the object, the error of coordinates of the object may be slight and admissible.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An apparatus for calculating the position of an object, the apparatus being suitable for an optical touch system and being provided for determining a representative position of the object in a sensed image, the apparatus comprising:
   an image sensor; and
   a processing circuit electrically coupled to the image sensor, the processing circuit acquiring a sensed image containing an image of the object through the image sensor, and the processing circuit obtaining brightness value of at least one pixel in each pixel column of the sensed image to obtain a first brightness distribution profile, the processing circuit comparing the first brightness distribution profile with a second brightness distribution profile obtained from a background image, so as to select a plurality of column pixel brightness values in the first brightness distribution profile as an imaging range of the object, the processing circuit selecting column pixel brightness value corresponding to at least one dot from a curve segment of the imaging range in the second brightness distribution profile and acquiring the column pixel brightness value corresponding to the lowest dot of the at least one dot, so as to regard the acquired column pixel brightness value corresponding to the lowest dot as a brightness reference value, the processing circuit further calculating the brightness difference between the brightness reference value and the column pixel brightness value corresponding to each dot of the curve segment of the imaging range in the first brightness distribution profile, so as to calculate a gravity of the imaging range and to regard the gravity as a representative position of the object in the sensed image.

2. The apparatus as claimed in claim 1, wherein after comparing the first brightness distribution profile and the second brightness distribution profile, the processing circuit regards a distribution range of a plurality of column pixel brightness values in the first brightness distribution profile as the imaging range of the object, there is a brightness difference lager than a predetermined brightness difference between each column pixel brightness value in the distribution range and each column pixel brightness value in a corresponding range in the second brightness distribution profile.

3. The apparatus as claimed in claim 1, wherein the processing circuit acquires the brightness values of the N brightest pixels of each pixel column in the sensed image, so as to calculate an average brightness value or a total brightness value of the selected N brightest pixels in each pixel column to obtain the first brightness distribution profile, wherein N is a natural number, and the background image is an image which is obtained in advance by the processing circuit, and it does not contain any image of the object, the processing circuit also calculates an average brightness value or a total brightness value of the selected N brightest pixels in each pixel column of the background image, so as to obtain the second brightness distribution profile.

4. The apparatus as claimed in claim 1, wherein the processing circuit acquires the brightness values of a plurality of pixels whose brightness values are larger than a predetermined value in each pixel column of the sensed image, so as to calculate an average brightness value of the pixels whose brightness values are larger than the predetermined value in each pixel column to obtain the first brightness distribution profile, and the background image is an image which is obtained in advance by the processing circuit, and it does not contain any image of the object, the processing circuit also calculates an average brightness value of the pixels whose brightness values are larger than the predetermined value in each pixel column of the background image.

5. The apparatus as claimed in claim 1, wherein the image sensor comprises an infra-red illuminating unit and an infra-red filtering unit which only allows infra-red ray to pass through, and the image sensor acquires the sensed image through the infra-red filtering unit.

6. A method for calculating the position of an object, the method being used for an optical touch system and being provided for determining a representative position of the object in an sensed image, the method comprising the steps of:
   acquiring a brightness value of at least a pixel in each pixel column of the sensed image containing an image of the object to obtain a first brightness distribution profile;
   comparing the first brightness distribution profile with a second brightness distribution profile obtained from a background image, so as to select a plurality of column pixel brightness values in the first brightness distribution profile as an imaging range of the object;
   selecting a column pixel brightness value corresponding to at least one dot from a curve segment of the imaging range in the second brightness distribution profile and acquiring the column pixel brightness value corresponding to the lowest dot of the at least one dot, so as to regard the acquired column pixel brightness value corresponding to the lowest dot as a brightness reference value; and
   calculating the brightness difference between the brightness reference value and the column pixel brightness value corresponding to each dot of the curve segment of the imaging range in the first brightness distribution profile, so as to calculate a gravity of the imaging range and to regard the gravity as a representative position of the object in the sensed image.

7. The method as claimed in claim 6, wherein after comparing the first brightness distribution profile and the second brightness distribution profile, a distribution range of a plurality of column pixel brightness values in the first brightness distribution profile is regarded as the imaging range of the object, wherein there is a brightness difference lager than a predetermined brightness difference between each column pixel brightness value in the distribution range and each column pixel brightness value in a corresponding range in the second brightness distribution profile.

8. The method as claimed in claim 6, wherein the brightness values of the N brightest pixels of each pixel column in the sensed image are acquired, so as to calculate an average brightness value or a total brightness value of the selected N brightest pixels in each pixel column to obtain the first brightness distribution profile, wherein N is a natural number, the background image is an image which is obtained in advance, and it does not contain any image of the object, and an average brightness value or an total brightness value of the selected N brightest pixels in each pixel column of the background image is also calculated, so as to obtain the second brightness distribution profile.

9. The method as claimed in claim 6, wherein the brightness values of a plurality of pixels whose brightness values are larger than a predetermined value in each pixel column of the sensed image are acquired, so as to calculate an average brightness value of the plurality of pixels of each pixel column to obtain the first brightness distribution profile, the background image is an image which is obtained in advance, and it does not contain any image of the object, and an average brightness value of the pixels whose brightness values are larger than the predetermined value in each pixel column of the background image is calculated, so as to obtain the second brightness distribution profile.

10. An apparatus for calculating the position of an object, the apparatus being suitable for an optical touch system and being provided for determining a representative position of the object in a sensed image, the apparatus comprising:
  an image sensor; and
  a processing circuit electrically coupled to the image sensor, the processing circuit acquiring a sensed image containing an image of the object through the image sensor, and the processing circuit obtaining brightness value of at least one pixel in each pixel column of the sensed image to obtain a first brightness distribution profile, the processing circuit comparing the first brightness distribution profile with a second brightness distribution profile obtained from a background image, so as to select a plurality of column pixel brightness values in the first brightness distribution profile as an imaging range of the object, the processing circuit selecting one column pixel brightness value corresponding to at least one dot from a curve segment of the imaging range in the second brightness distribution profile as a brightness reference value, the processing circuit further calculating the brightness difference between the brightness reference value and the column pixel brightness value corresponding to each dot of the curve segment of the imaging range in the first brightness distribution profile, so as to calculate a gravity of the imaging range and to regard the gravity as a representative position of the object in the sensed image.

11. An optical touch system, comprising:
  a touch surface used for providing an interactive interface between an object and the optical touch system;
  at least two apparatuses as claimed in claim 10, for calculating the representative position of the object sensed by the two apparatuses, the said at least two apparatuses being configured in different places of the touch surface, and the relative position between the said at least two apparatuses and the touch surface being known; and
  a coordinates-calculating apparatus used for calculating a relative coordinates of the object on the touch surface in accordance with the relative position between the said at least two apparatuses and the touch surface and the representative positions of the object sensed by the said at least two apparatuses.

12. An optical touch system, comprising:
  a touch surface used for providing an interactive interface between an object and the optical touch system;
  a mirror element used for forming a mirror image of the touch surface;
  an apparatus as claimed in claim 10, for calculating a representative position of the object sensed by the apparatus and for calculating a representative position of a virtual object formed in the mirror image, wherein the relative position between the apparatus and the touch surface is known, and the apparatus and the mirror element are configured on two opposite sides of the touch surface; and
  a coordinates-calculating apparatus used for calculating a relative coordinates of the object on the touch surface in accordance with the relative position between the apparatus and the touch surface and the representative positions of the object and the virtual object sensed by the apparatus.

* * * * *